United States Patent
Mirzai

(10) Patent No.: US 12,431,963 B2
(45) Date of Patent: Sep. 30, 2025

(54) METHOD FOR PROVIDING ASSISTANCE TO A VEHICLE

(71) Applicant: Volvo Truck Corporation, Gothenburg (SE)

(72) Inventor: Nick Mirzai, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 301 days.

(21) Appl. No.: 17/619,605

(22) PCT Filed: Jun. 26, 2019

(86) PCT No.: PCT/EP2019/067011
§ 371 (c)(1),
(2) Date: Dec. 16, 2021

(87) PCT Pub. No.: WO2020/259822
PCT Pub. Date: Dec. 30, 2020

(65) Prior Publication Data
US 2022/0302995 A1    Sep. 22, 2022

(51) Int. Cl.
*H04B 7/185*    (2006.01)
*H04L 41/06*    (2022.01)
(Continued)

(52) U.S. Cl.
CPC ......... *H04B 7/18506* (2013.01); *H04L 41/06* (2013.01); *H04L 43/0811* (2013.01);
(Continued)

(58) Field of Classification Search
CPC ............ H04B 7/18502; H04B 7/18506; B64C 39/024; B64C 39/02; H04L 41/06; H04L 43/0811; B64U 80/86; B64U 2201/10; B64U 10/14; B64U 2101/30; B64U 2101/20; B64U 2101/00; B64U 70/93; H04M 11/04; B60R 25/305; B60R 2021/0027; H04W 24/04
See application file for complete search history.

(56) References Cited

U.S. PATENT DOCUMENTS

2014/0316616 A1* 10/2014 Kugelmass .......... G06T 11/206
                                                                701/8
2019/0061663 A1    2/2019 Benmimoun et al.
(Continued)

FOREIGN PATENT DOCUMENTS

DE    102016006324 A1    7/2017
DE    102017214665 A1    2/2019
(Continued)

OTHER PUBLICATIONS

International Search Report and Written Opinion for International Patent Application No. PCT/EP2019/067011, mailed Mar. 26, 2020, 14 pages.

*Primary Examiner* — Quoc Thai N Vu
(74) *Attorney, Agent, or Firm* — Withrow & Terranova, PLLC

(57) ABSTRACT

The present disclosure relates to a method for providing assistance to a vehicle, specifically by an unmanned aerial vehicle (UAV), where the UAV is provided for establishing a network communication between the UAV and a server in case of an unwanted situation involving the vehicle.

20 Claims, 3 Drawing Sheets

(51) Int. Cl.
*H04L 43/0811* (2022.01)
*B64U 10/14* (2023.01)
*B64U 80/86* (2023.01)
*B64U 101/20* (2023.01)
*B64U 101/30* (2023.01)

(52) U.S. Cl.
CPC .............. *B64U 10/14* (2023.01); *B64U 80/86* (2023.01); *B64U 2101/20* (2023.01); *B64U 2101/30* (2023.01); *B64U 2201/10* (2023.01)

(56) References Cited

U.S. PATENT DOCUMENTS

2019/0168869 A1   6/2019  Georges
2019/0261152 A1*  8/2019  Weinfield ........... H04B 7/18504
2020/0166929 A1*  5/2020  Jiwani .................... G06V 20/17

FOREIGN PATENT DOCUMENTS

| WO | 2015155143 A1 | 10/2015 | |
| WO | 2016148368 A1 | 9/2016 | |
| WO | 18009190 A1 | 1/2018 | |
| WO | 2018080425 A1 | 5/2018 | |
| WO | 2018080425 A8 | 5/2018 | |
| WO | WO-2018164683 A1 * | 9/2018 | ............ B60W 10/26 |
| WO | 2018209375 A1 | 11/2018 | |

* cited by examiner

METHOD FOR PROVIDING ASSISTANCE TO A VEHICLE

This application is a 35 USC 371 national phase filing of International Application No. PCT/EP2019/067011, filed Jun. 26, 2019, the disclosure of which is incorporated herein by reference in its entirety.

TECHNICAL FIELD

The present disclosure relates to a method for providing assistance to a vehicle, specifically by means of an unmanned aerial vehicle (UAV) comprised with the vehicle, where the UAV is provided for establishing a network communication between the UAV and a server in case of an unwanted situation involving the vehicle. The present disclosure also relates to a corresponding control system and to a computer program product.

BACKGROUND

Over the recent years there have been great advances in automated assistance in vehicles, including for example automatically deploying airbags, semi or fully autonomous operation of the vehicle, effectively providing driver assistance and safety functions, such as cruise control, etc. Another example of vehicle assistance relates to automated emergency calls, greatly improving the safety involving vehicle operation.

To prepare such an automated emergency call, it may for example be possible to make use of an automatic vehicle location and collision notification system that is able to ascertain whether a vehicular collision has occurred and communicates directly with an emergency facility. The vehicular collision may for example be detected if one of the airbags of the vehicle has been activated.

A more advanced version of such a system is disclosed in US20190061663. Specifically, in US20190061663 there is suggested to launch an accompanying autonomous drone from the vehicle in case it has been detected that one of the airbags of the vehicle has been activated. The drone is in turn arranged to autonomously records aerial images of the vehicle and surroundings of the vehicle using a camera, where the images subsequently are transmitted to an emergency control center using a telematic unit of the vehicle.

Even though the solution in US20190061663 presents an interesting approach to further improving the safety involving vehicle operation, it is solely based on a vehicle operation where one or a plurality of occupants (driver and possibly passengers) are present. Bearing this in mind, there appears to be room for further improvements in relation to partly or completely autonomous vehicles, not necessarily having occupants present.

SUMMARY

According to an aspect of the present disclosure, the above is at least partly alleviated by a computer implemented method for providing assistance to a vehicle, the vehicle comprising a releasable unmanned aerial vehicle (UAV), and the vehicle being arranged in network communication with a first server arranged off-board the vehicle, wherein the method comprises the steps of determining a network failure in the communication between the first server and the vehicle, deploying the UAV only if the network failure has been determined, capturing at least one of an image or a video using the UAV, determining, based on the captured image or video, if the vehicle is in need of assistance, and establishing an independent network communication between the UAV and a second server to request vehicle assistance.

The present disclosure is based upon the realization that the prior-art approach of using airbags activation as a means of determining if further assistance is needed, could be seen as an implementation of the past. For novel vehicles, such as for example an autonomous vehicle possibly without any driver or further occupants, there is a necessity to search for other triggers to determine if the vehicle is in need of further assistance. In line with the present disclosure this is achieved by determining if a previously established network communication between the vehicle and a first server arranged off-board the vehicle is unsatisfactorily, e.g. meaning that the communication is completely or partially failing. The previously established network communication between the vehicle and a first server may for example generally be used for regularly communicating status data from the vehicle to the first server, as well as for providing control data from the server to the vehicle.

In line with the present disclosure, in case the network communication is determined to be unsatisfactorily, only then the UAV is deployed for capturing at least one of an image or a video, e.g. of the vehicle and the surrounding of the vehicle. The UAV will also form an independent network communication to a second server to request vehicle assistance.

An advantage following the implementation as defined above is that the UAV is arranged to function completely independent of the vehicle, also in relation to the network communication. That is, the UAV will set-up its own network communication to ensure that the captured image or video will be received by a party (such as the owner of the vehicle) operating to provide vehicle assistance.

It is worth noticing that the expression "autonomous vehicle", as used above, should be interpreted broadly and relates to a vehicle that is operated in a fully or partially autonomous mode. In a partially autonomous vehicle some functions can optionally be manually controlled (e.g. by a driver) some or all of the time. Further, a partially autonomous vehicle may be configured to switch between a fully-manual operation mode and a partially-autonomous and/or a fully-autonomous operation mode. It should also be understood that the concept as presented in line with the present disclosure may be used also in relation to non-autonomous vehicles.

In accordance to an embodiment of the present disclosure, the image or video is only captured when the UAV is arranged in an elevated position in relation to the vehicle. Accordingly, such an implementation may in some situations reduce any unnecessary transmission of information between the UAV and the second server, possibly increasing the operational time of the UAV due to a reduced energy consumption. The UAV may in some embodiments be battery operated, however other means for powering the UAV is possible and within the scope of the present disclosure.

Preferably, the UAV is deployed for operation in accordance to a predetermined instruction. Such a predetermined instruction may for example include information relating to a desired elevated height in relation to the vehicle, an operational range (meters) to the vehicle, etc. The predetermined instruction may for example further dictate how the UAV is to create a panorama circling around the vehicle for capturing the vehicle from possibly all sides, as well as the surrounding of the vehicle In some embodiments of the present disclosure the network failure is determined at the first server. However, the network failure could also be determined by the vehicle or by the UAV, where the UAV may "eavesdrop" on the network communication between the vehicle and the first server. In case the first server determines the network failure, the first server may possibly instruct the UAV to set-up its independent network communication. Further means for determining the network failure is of course possible and within the scope of the present disclosure.

It is further worth noticing that the expression network failure should be interpreted broadly, as indicated above. Accordingly, within the scope of the present disclosure a network failure may include a partly or full failure of the network connection between the vehicle and the first server. It should be understood that the vehicle comprises an on-board transceiver arranged in communication with an electronic control unit (ECU) that is also provided as an on-board component of the vehicle In an embodiment of the present disclosure the second server is arranged to control the operation of the UAV. That is, in such an embodiment the second server may be arranged to control how the UAV is surveilling the vehicle and its surrounding, e.g. by transmitting control signals to the UAV for controlling a location of the UAV in relation to the vehicle, as well as how the images and/or video is to be captured.

Furthermore, in accordance to an embodiment of the present disclosure the UAV may be adapted to initiate a network communication with the vehicle, for establishing a relayed network communication between the vehicle and the first server. Accordingly, in case only the network communication between the vehicle and the first server has failed, but the vehicle in itself still may be functional (or somewhat functional), the UAV may be used for allowing the first server to communicate (in a relayed manner) directly with the vehicle. The information relayed to the vehicle may in some embodiments include data for remotely controlling the operation of the vehicle by the second server.

Preferably, in one embodiment of the present disclosure the second server is implementing an image processing scheme for automatically determining a type of vehicle assistance based on the image or video being received from the UAV. Such an implementation is highly desirable since the manual operator time needed for determining what to do next may be greatly reduced, thus possibly reducing the cost for providing assistance to the vehicle. In a possible embodiment, the image processing scheme comprises a machine learning portion. Such a machine learning portion may for example be previously trained towards different scenarios, such as involving different type of vehicle failures, fire, roll-over, etc.

Even though the above discussion has been made with focus on using a first and a second server, it should be understood that it may be possible to provide the functionality of the first and the second server as a common single server. The first/second/common server may be implemented as a so-called cloud server. Thus, the computing power provided by means of the present disclosure may be distributed between a plurality of servers, and the location of the servers must not be explicitly defined. Advantageous following the use of a cloud-based solution is also the inherent redundancy achieved.

According to another aspect of the present disclosure there is provided a control system adapted to provide assistance to a vehicle, the vehicle comprising a releasable unmanned aerial vehicle (UAV), and the vehicle being arranged in network communication with a first server arranged off-board the vehicle, wherein the control system is adapted to determine a network failure in the communication between the first server and the vehicle, deploy the UAV only if the network failure has been determined, capture at least one of an image or a video using the UAV, determine, based on the captured image or video, if the vehicle is in need of assistance, and establish an independent network communication between the UAV and a second server to request vehicle assistance. This aspect of the present disclosure provides similar advantages as discussed above in relation to the previous aspect of the present disclosure.

In a preferred embodiment of the present disclosure the system comprises the first server. Also, the vehicle may e.g. be one of a bus, a truck, a car, or any form of construction equipment. The vehicle may furthermore be at least one of a pure electrical vehicle (PEV) and a hybrid electric vehicle (HEV). Furthermore, as indicated above the vehicle may in some embodiments be an autonomous vehicle.

According to a further aspect of the present disclosure there is provided a computer program product comprising a non-transitory computer readable medium having stored thereon computer program means for operating a control system adapted to provide assistance to a vehicle, the vehicle comprising a releasable unmanned aerial vehicle (UAV), and the vehicle being arranged in network communication with a first server arranged off-board the vehicle, wherein the computer program product comprises code for determining a network failure in the communication between the first server and the vehicle, code for deploying the UAV only if the network failure has been determined, code for capturing at least one of an image or a video using the UAV, code for determining, based on the captured image or video, if the vehicle is in need of assistance, and code for establishing an independent network communication between the UAV and a second server to request vehicle assistance. Also this aspect of the present disclosure provides similar advantages as discussed above in relation to the previous aspects of the present disclosure.

The computer readable medium may be any type of memory device, including one of a removable nonvolatile random access memory, a hard disk drive, a floppy disk, a CD-ROM, a DVD-ROM, a USB memory, an SD memory card, or a similar computer readable medium known in the art.

Further advantages and advantageous features of the present disclosure are disclosed in the following description and in the dependent claims.

BRIEF DESCRIPTION OF THE DRAWINGS

With reference to the appended drawings, below follows a more detailed description of embodiments of the present disclosure cited as examples.

In the drawings.

DETAILED DESCRIPTION OF EXAMPLE EMBODIMENTS OF THE INVENTION

Figure 1A:
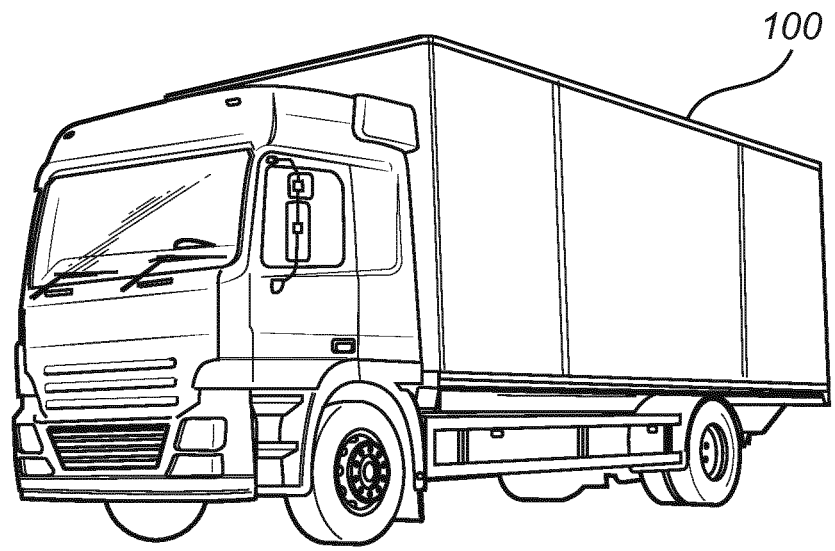
FIGS. 1A illustrates a truck, 1B a bus and 1C a wheel loader in which the control system according to the present disclosure may be incorporated.

The present disclosure will now be described more fully hereinafter with reference to the accompanying drawings, in which currently preferred embodiments of the present disclosure are shown. This disclosure may, however, be embodied in many different forms and should not be construed as limited to the embodiments set forth herein; rather, these embodiments are provided for thoroughness and completeness, and fully convey the scope of the disclosure to the skilled addressee. Like reference characters refer to like elements throughout.

Figure 1B:
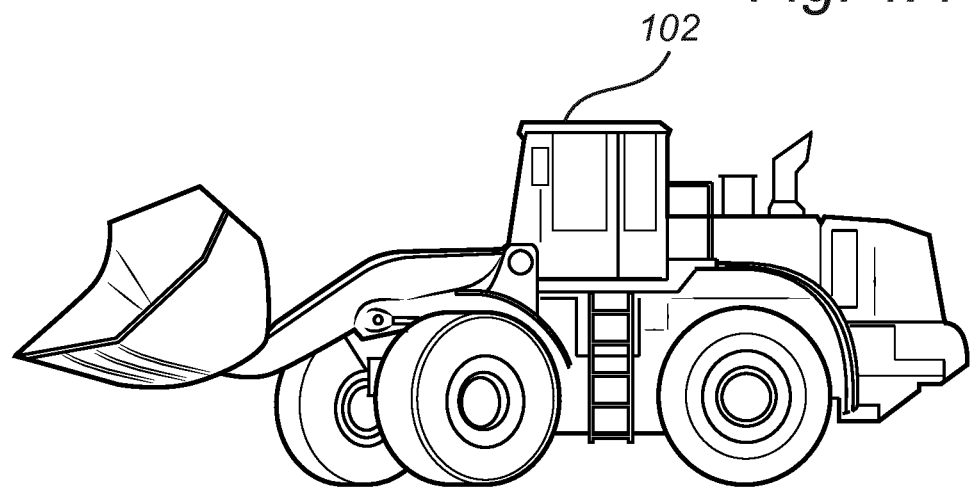
Figure 1C:
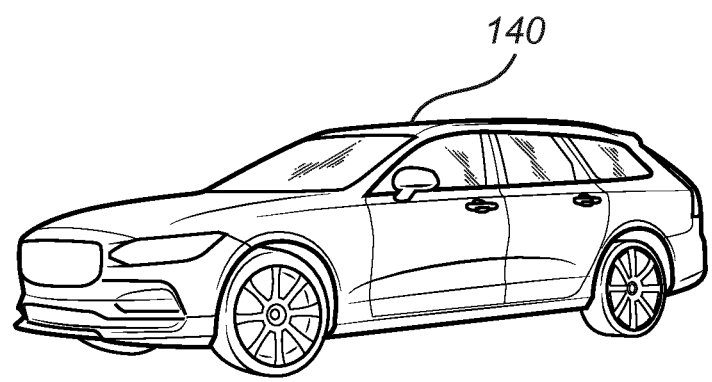
Figure 2:
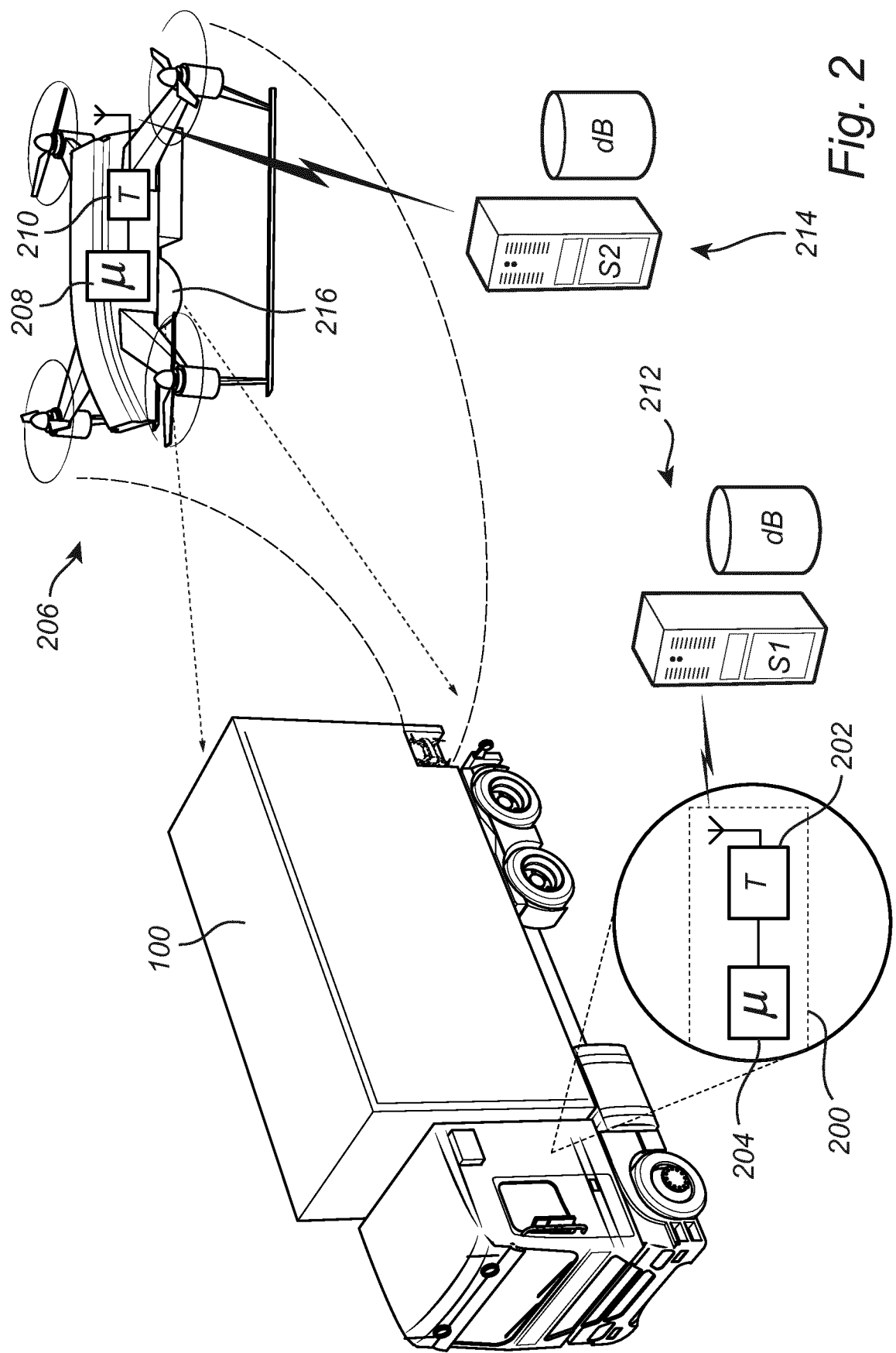
FIG. 2 illustrates a conceptual control system in accordance to a currently preferred embodiment of the present disclosure.

Referring now to the drawings and to FIG. 1A in particular, there is depicted an exemplary vehicle, here illustrated as a truck 100, in which a control system 200 (as shown in FIG. 2) according to the present disclosure may be incorporated. The control system 200 may of course be implemented, possibly in a slightly different way, in a bus 102 as shown in FIG. 1B, wheel loader as shown in FIG. 1C, a car, a bus, etc.

The vehicle may for example be one of an electric or hybrid vehicle, or possibly a gas, gasoline or diesel vehicle. The vehicle comprises an electric machine (in case of being an electric or hybrid vehicle) or an engine (such as an internal combustion engine in case of being a gas, gasoline or diesel vehicle). The vehicle may further be manually operated, fully or semi-autonomous.

FIG. 2 shows a conceptual and exemplary implementation of the control system 200 according to the present disclosure, presented in a non-limiting manner. Other ways of implementing the control system 200 is possible and within the scope of the present disclosure. The exemplary vehicle 100 is provided with a first transceiver 202 and a first electronic control unit (ECU) 204 arranged in communication with the transceiver 202. The vehicle 100 is further provided with a releasable unmanned aerial vehicle (UAV) 206, in the illustrated embodiment shown to be deployable from the back of the vehicle 100. Other means of deploying the UAV 206 is possible and within the scope of the present disclosure. The UAV 206 is correspondingly provided with a second transceiver 208 and a second ECU 210.

FIG. 2 further illustrates a first 212 and the second 214 server. The first server 212 is shown to be connected to the first transceiver 202 of the vehicle 100, and the second server 214 is shown to be connected to the second transceiver of the UAV 206. Each of the first 212 and the second 214 server may include a database, holding information relating to the vehicle, image/video received from the UAV 206, etc.

For reference, the first 202 and/or the second 208 transceiver may be arranged to allow for any form of wireless connections like WLAN, CDMA, GSM, GPRS, 3G mobile communications, 3/4/5G mobile communications, or similar. Other present of future wireless communication protocols are possible and within the scope of the present disclosure, such as any form of Vehicle-to-everything (V2X) communication protocols. In a possible embodiment the communication between the transceiver 202/208 and the servers 212/214 is over the Internet. Accordingly, the scope of the present disclosure is by no means limited to dedicated singular connections between the transceivers 202/208 and the servers 212/214, respectively. That is, also a shared communication means such as the Internet may be used for the network communication between the first transceiver 202 and the first server 212 as well as for the network communication second transceiver 208 and the second servers 214.

Furthermore, the first 204 and/or the second 210 ECU 204 may for example be manifested as a general-purpose processor, an application specific processor, a circuit containing processing components, a group of distributed processing components, a group of distributed computers configured for processing, a field programmable gate array (FPGA), etc. The processor may be or include any number of hardware components for conducting data or signal processing or for executing computer code stored in memory. The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

Additionally, the UAV 206 may be implemented in any form suitable to be used in relation to the specific type of vehicle 100. That is, a somewhat larger vehicle, such as a truck, may possibly hold a larger UAV as compared to a smaller vehicle, such as a car. Different types of UAVs 206 are possible and within the scope of the present disclosure. Also, in the illustration as presented in FIG. 2, the drone 206 is equipped with a camera 216 arranged to capture at least one of an image or a video, where the camera 216 is arranged in communication with the second ECU 210.

Figure 3:
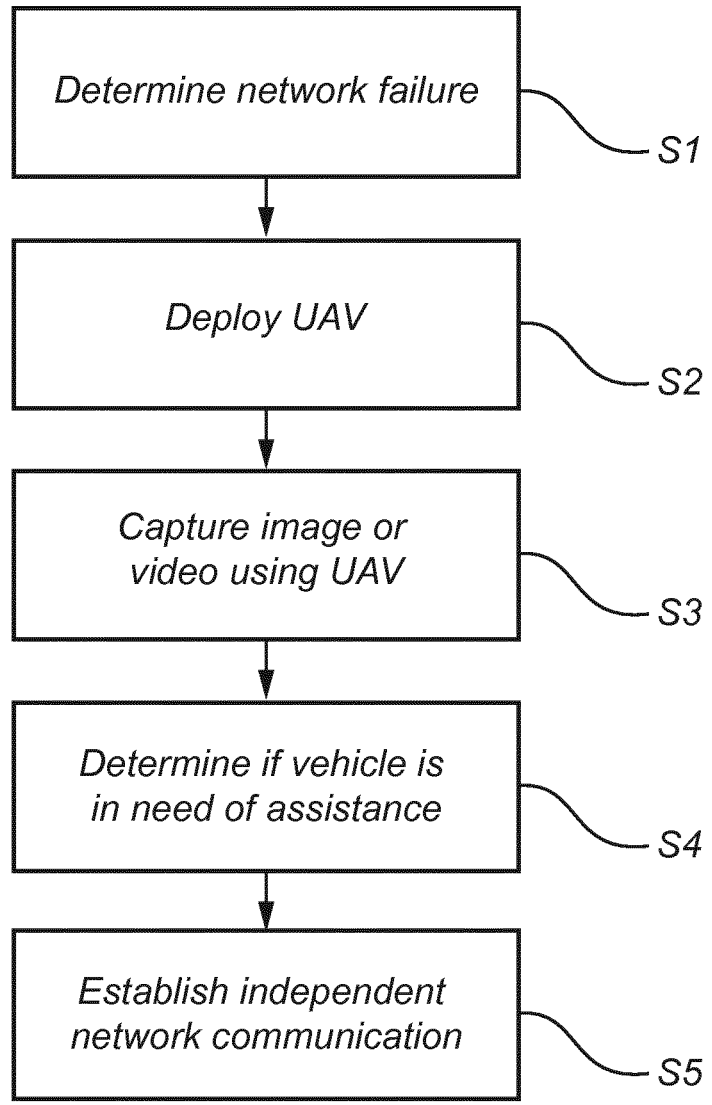
FIG. 3 illustrates the processing steps for performing the method according to the present disclosure.

During operation of the control system 200 for provide assistance to the vehicle 100, 102, 104, with further reference to FIG. 3, the process starts by a detection of a network failure between the first server 212 and the first transceiver 202 arranged on-board the vehicle 100. As indicated above, network failure could manifest in different ways such as by a full or a complete lost network communication. The detection of the network failure may be determined by any of the first server 212 or the transceivers 202/208. In the present illustration, the UAV 206 is connected to a CAN bus of the vehicle 100, where the UAV 206 is adapted to continuously receive indications of a functioning network communication between the first transceiver 202 of the vehicle 100 and the first server 212.

Accordingly, in this embodiment the second ECU 210 of the UAV 206 is arranged to determine, S1, if there is a network failure in the communication between the first server 212 and the vehicle 100. Once said network failure has been determined, the second ECU 210 initiate a process to deploy, S2, the UAV 206 from the back of the vehicle. This may in some embodiments activate a docking mechanism (not shown) at the vehicle 100 for deploying the UAV 206.

Once the UAV 206 has been deployed, the further steps are performed for providing assistance to the vehicle 100. These further steps include capturing, S3, at least one of an image or a video using the UAV 206 using the camera 216, determining S4, based on the captured image or video, if the vehicle 100 is in need of assistance, and establishing, S5, an independent network communication between the UAV 206 and the second server 214 to request vehicle assistance.

It should explicitly be understood that these steps may be performed in subsequently or simultaneously in any desired order.

For example, in one embodiment it is possibly to autonomously control the UAV 206 to rise to a location slightly above the vehicle, such as between 5-10 meters above the vehicle 100. Other ranges are of course possible and within the scope of the present disclosure. Once at the elevated location, the UAV 206 starts to capture, S3, said images or video sequences of the vehicle 100 and/or the surrounding of the vehicle 100. The images/videos are preferably at least intermediately stored at a memory element (not shown) comprised with the UAV 206.

In line with this embodiment, the UAV 206 may perform a pre-assessment of the captured images/video for determining, S4 if the vehicle 100 is in need of assistance. Such an assessment may take different forms, from the more basic implementations where e.g. the determination that the vehicle is in a stand-still mode is enough for determining that the vehicle 100 is in need of assistance. Other more advanced implementations as of course possible, such e.g. determining that there is a fire in relation to the vehicle 100, or any other forms of unwanted behavior in relation to the vehicle 100 (burglary, sabotage, accident, etc.). In one embodiment the UAV 206 may implement edge computing for the image processing methodology.

In line with this embodiment, in case the pre-assessment of the captured images/video results in an indication that assistance is needed, the independent network communication between the UAV 206 and a second server 214 may be formed to request said vehicle assistance. The assistance may take the form of deploying service personnel, the fire department, a towing service, etc., possibly dependent on the outcome of the pre-assessment.

In an alternative embodiment, the independent network communication between the UAV 206 and the second server 214 may possibly be performed before the steps of capturing image(s)/video(s) and determining if the vehicle 100 is in need of assistance. That is, in such an alternative embodiment the independent network communication between the UAV 206 and the second server 214 is formed as soon as (or possibly before) the UAV 206 has been deployed from the vehicle 100. Accordingly, once the UAV 206 starts to capture image(s)/video(s) using the camera 216, the image(s)/video(s) may be directly transferred to the second server 214. The second server 214 may then perform the step of assessing the captured images/video for determining if the vehicle 100 is in need of assistance.

In case of performing the assessment at the second server 214, it could in some embodiments be possible to allow for an increase complexity in determining the current situation involving the vehicle 100. For example, the second server 214 may in some embodiment be adapted to implement a machine learning component, where said machine learning component has been pre-trained in relation to different vehicle situations. Such situations may for example include different types of vehicle accidents, etc.

Dependent on the state of the vehicle 100, it may in some embodiments of the present disclosure be possible to also allow the UAV 206 to relay communication between the first server 212 and the vehicle 100. That is, in some embodiments the UAV 206 and the vehicle 100 may be arranged to form a further independent network communication therebetween. Accordingly, if there is only a failure in the network communication between the vehicle 100 and the server 212 but not really a problem with the vehicle 100, this may be bypassed by allowing the communication to instead go from the first server 212 to the second server 214, by the UAV 206 and then to the vehicle 100.

As indicated above, in some implementations the first 212 and the second 214 server may be one and the same server, i.e. providing the functionality of both the servers 212, 214. That is, two independent network connections may in such an embodiment be formed with the vehicle 100 and the UAV 206.

The present disclosure contemplates methods, devices and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor.

By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data that cause a general-purpose computer, special purpose computer, or special purpose processing machines to perform a certain function or group of functions.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

Additionally, even though the disclosure has been described with reference to specific exemplifying embodiments thereof, many different alterations, modifications and the like will become apparent for those skilled in the art.

Variations to the disclosed embodiments can be understood and effected by the skilled addressee in practicing the claimed disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A computer implemented method for providing assistance to a vehicle, the vehicle comprising a releasable unmanned aerial vehicle (UAV) and a first transceiver arranged in a first network communication with a first server arranged off-board the vehicle, wherein the method comprises the steps of:

determining a network failure in the first network communication between the first server and the vehicle, deploying the UAV only when the network failure has been determined, capturing at least one of an image or a video using the UAV, determining, based on the captured image or video, if the vehicle is in need of assistance, and establishing a second network communication, separate from and independent of the first network communication, between a second transceiver of the UAV and a second server to request vehicle assistance, the second server physically and logically distinct from the first server.

2. The method of claim 1, wherein the image or video is only captured when the UAV is arranged in an elevated position in relation to the vehicle.

3. The method of claim 1, wherein the UAV is deployed for operation in accordance to a predetermined instruction.

4. The method of claim 3, wherein the predetermined instruction comprises operational instructions for capturing the vehicle and a surrounding of the vehicle.

5. The method of claim 1, wherein the network failure is determined at the first server or at the vehicle.

6. The method of claim 1, wherein the second transceiver of the UAV is adapted to initiate a third network communication with the first transceiver of the vehicle, for establishing a relayed network communication between the vehicle and the first server through the UAV.

7. A control system adapted to provide assistance to a vehicle, the vehicle comprising a releasable unmanned aerial vehicle (UAV) and a first transceiver arranged in a first network communication with a first server arranged off-board the vehicle, wherein the control system is configured to:

determine a network failure in the first network communication between the first server and the vehicle, deploy the UAV only when the network failure has been determined, capture at least one of an image or a video using the UAV, determine, based on the captured image or video, if the vehicle is in need of assistance, and establish a second network communication, separate from and independent of the first network communication, between a second transceiver of the UAV and a second server to request vehicle assistance, the second server physically and logically distinct from the first server.

8. The control system of claim 7, wherein the image or video is only captured when the UAV is arranged in an elevated position in relation to the vehicle.

9. The control system of claim 7, wherein the UAV is deployed for operation in accordance to a predetermined instruction.

10. The control system of claim 9, wherein the predetermined instruction comprises operational instructions for capturing the vehicle and a surrounding of the vehicle.

11. The control system of claim 7, wherein the network failure is determined at the first server or at the vehicle.

12. The control system of claim 7, wherein the second server is arranged to control operation of the UAV.

13. The control system of claim 7, wherein the second transceiver of the UAV is adapted to initiate a third network communication with the first transceiver of the vehicle, for establishing a relayed network communication between the vehicle and the first server through the UAV.

14. The control system of claim 7, wherein the first server implements an image processing scheme for automatically determining a type of vehicle assistance based on the image or video being received from the UAV.

15. The control system of claim 14, wherein the image processing scheme comprises a machine learning portion.

16. The control system of claim 7, wherein the first server and the second server are provided as a common server.

17. The control system of claim 7, wherein the control system comprises the first server.

18. The control system of claim 7, wherein the vehicle is a working machine, a bus, or a truck.

19. The control system of claim 7, wherein the vehicle is an autonomous vehicle.

20. A computer implemented method for providing assistance to a vehicle, the vehicle comprising a releasable unmanned aerial vehicle (UAV), and the vehicle being arranged in network communication with a first server arranged off-board the vehicle, wherein the method comprises the steps of:

determining a network failure in the communication between the first server and the vehicle, deploying the UAV only when the network failure has been determined, capturing at least one of an image or a video using the UAV, determining, based on the captured image or video, if the vehicle is in need of assistance, and establishing an independent network communication between the UAV and a second server, which is separate, physically distinct, and logically distinct from the first server, to request vehicle assistance.

* * * * *